(12) United States Patent
Kobayashi

(10) Patent No.: US 6,490,417 B1
(45) Date of Patent: Dec. 3, 2002

(54) CAMERA ENABLING CONFIRMATION OF NORMAL COMPLETION OF FILM REWIND WITHIN THE FINDER

(75) Inventor: Yoshiaki Kobayashi, Hachioji (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 09/563,428

(22) Filed: May 3, 2000

(30) Foreign Application Priority Data

May 13, 1999 (JP) ............................................. 11-132686

(51) Int. Cl.[7] ........................... G03B 17/18; G03B 17/20
(52) U.S. Cl. ........................ 396/281; 396/287; 396/296
(58) Field of Search ................................ 396/281, 284, 396/287, 288, 289–292, 296, 408, 409, 410

(56) References Cited

U.S. PATENT DOCUMENTS

| | | | | |
|---|---|---|---|---|
| 4,372,657 A | * | 2/1983 | Iwata et al. ................. | 396/287 |
| 5,532,785 A | * | 7/1996 | Goto et al. .................. | 396/246 |
| 6,078,755 A | * | 6/2000 | Ishimaru et al. ............ | 396/287 |
| 6,148,154 A | * | 11/2000 | Ishimaru et al. ............ | 396/287 |
| 6,167,203 A | * | 12/2000 | Ishimaru et al. ............ | 396/284 |

FOREIGN PATENT DOCUMENTS

| | | | | |
|---|---|---|---|---|
| JP | 5-165017 | | 6/1993 | |
| JP | 07-064154 | * | 3/1995 | ........... G03B/13/02 |

* cited by examiner

*Primary Examiner*—Alan A. Mathews
*Assistant Examiner*—Arthur A Smith
(74) *Attorney, Agent, or Firm*—Frishauf, Holtz, Goodman & Chick, P.C.

(57) ABSTRACT

With a camera, a photographing prohibition state can surely be recognized only by viewing a liquid crystal display. In the camera, an LCD with a variable transmissivity is disposed within a finder. A film is fed by a film feed section. When a film rewinding operation by the film feed section is completed, a CPU instructs an LCD drive section to lower the transmissivity of the LCD.

1 Claim, 12 Drawing Sheets

CAMERA ENABLING CONFIRMATION OF NORMAL COMPLETION OF FILM REWIND WITHIN THE FINDER

CROSS-REFERENCE TO RELATED APPLICATIONS

This application is based upon and claims the benefit of priority from the prior Japanese Patent Application No. 11-132686, filed May 13, 1999, the entire contents of which are incorporated herein by reference.

BACKGROUND OF THE INVENTION

The present invention relates to a camera having a liquid crystal display (LCD) in a finder.

There are known various prior-art techniques wherein an LCD is used for display in a finder of a camera.

The LCD displays, for example, an AF (auto-focus) target mark, various photographing modes, and switching of the angle of view for, e.g. a panorama picture or a normal picture. The types of conventionally used LCDs are, for example, so-called Guest Host type LCDs and TN (Twisted Nematic) type LCDs.

It has recently been proposed, as described in Japanese Patent Application KOKAI Publication No. 5-165017, to use a high-molecular dispersion type liquid crystal for an LCD in the finder of the camera. The high-molecular dispersion type liquid crystal described in this prior-art publication is a so-called positive type liquid crystal which takes a non-transmissive state when a voltage is applied, and takes a transmissive state when a voltage is not.

On the other hand, there is known a so-called negative-type high-molecular dispersion type liquid crystal which takes a transmissive state when a voltage is applied, and takes a non-transmissive state when a voltage is not.

The LCD using the high-molecular dispersion type liquid crystal has a high degree of dispersion and, where it is used in the finder of the camera, the intensity of light arriving at the eye is very weak. Accordingly, compared to the Guest Host type or TN type, a finder with high contrast can be fabricated.

Even in conventional Guest Host type LCDs, there are negative-type ones. In these years, various kinds of liquid crystals have become applicable to the finder of the camera.

In the meantime, a vigorous developmental effort is in progress to achieve full automatic operations of cameras, and in some types of cameras a photographing operation is automatically prohibited in situations which do not permit photographing.

Such cameras, however, have problems. In particular, the user may inadvertently attempt a photographing operation in such situations requiring a prohibition of photographing, which may easily occur to any users, that a film has been rewound but not yet been removed or a new film has been set but an auto-load operation for preparation of photographing has failed.

BRIEF SUMMARY OF THE INVENTION

The object of the present invention is to provide a camera which enables a user to exactly determine whether a photographing-prohibition state has occurred or not, only by viewing a liquid crystal display (LCD).

In order to achieve this object, according to a first aspect of the invention, there is provided a camera comprising: a liquid crystal display with a variable transmissivity, disposed within a finder; camera operation means for executing predetermined camera operations; determination means for determining whether the camera operation means is normal or whether the predetermined camera operations have normally been executed; and liquid crystal control means for varying the transmissivity of the liquid crystal display on the basis of a determination result of the determination means.

According to a second aspect of the invention, there is provided a camera comprising: a liquid crystal display with a variable transmissivity, disposed within a finder; film feed means for feeding a film; and liquid crystal control means for temporarily lowering a transmissivity of the liquid crystal display after a film rewinding operation by the film feed means is completed.

According to a third aspect of the invention, there is provided a camera comprising: a liquid crystal display disposed within a finder; film feed means for feeding a film; and liquid crystal control means for controlling the liquid crystal display such that a transmissivity of the finder varies, when a film rewinding operation by the film feed means is completed.

According to a fourth aspect of the invention, there is provided a camera comprising: a liquid crystal display device disposed within a finder; a liquid crystal drive circuit for driving the liquid crystal display device; a film feed mechanism for feeding a film loaded in the camera; and a CPU for controlling the film feed mechanism to execute a rewinding operation for rewinding the film and, after completion of the rewinding operation, varies a transmissivity of the liquid crystal display device through the liquid crystal drive circuit.

According to a fifth aspect of the invention, there is provided a camera comprising: a film loading chamber in which a film is to be loaded; a film loading chamber cover for opening and closing the film loading chamber; a liquid crystal display disposed within a finder; film feed means for executing an auto-loading windup operation for the film when the film is put in the film loading chamber and the film loading chamber cover is closed; and liquid crystal control means for lowering a transmissivity of the finder when the auto-loading windup operation by the film feed means has failed.

According to a sixth aspect of the invention, there is provided a camera comprising: a liquid crystal display disposed within a finder; film feed means for executing an auto-load windup feeding operation for a film; determination means for determining whether the auto-load windup feeding operation by the film feed means has normally been executed; and liquid crystal control means for controlling a transmissivity of the liquid crystal display on the basis of a determination result of the determination means.

According to a seventh aspect of the invention, there is provided a camera comprising: a liquid crystal display disposed within a finder; release signal output means for outputting a release signal; exposure means for performing an exposure operation in accordance with the release signal output from the release signal output means; determination means for determining whether an exposure operation of the exposure means is normal; and liquid crystal control means for controlling a transmissivity of the liquid crystal display on the basis of a determination result of the determination means.

According to an eighth aspect of the invention, there is provided a camera comprising: a liquid crystal display disposed within a finder; release signal output means for outputting a release signal; exposure means for performing an exposure operation in accordance with the release signal output from the release signal output means; determination means for determining a fault of the exposure means; and liquid crystal control means for temporarily lowering a transmissivity of the liquid crystal display in response to the operation of the exposure means, where no fault of the exposure means is determined by the determination means.

According to a ninth aspect of the invention, there is provided a camera comprising: a liquid crystal display device disposed within a finder; a liquid crystal drive circuit for driving the liquid crystal display device; a release switch for outputting a release signal; a shutter for controlling an exposure amount for a film; a shutter drive mechanism for driving the shutter; a photo-interrupter for outputting a signal when the shutter is set in an open state; and a CPU for outputting a control signal to the liquid crystal drive circuit such that the liquid crystal display device is set in a light-non-transmissive state, where the signal from the photo-interrupter is detected within a predetermined time period after the shutter drive mechanism is operated in response to the release signal from the release switch.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

An embodiment of the present invention will now be described with reference to the accompanying drawings.

Figure 1:
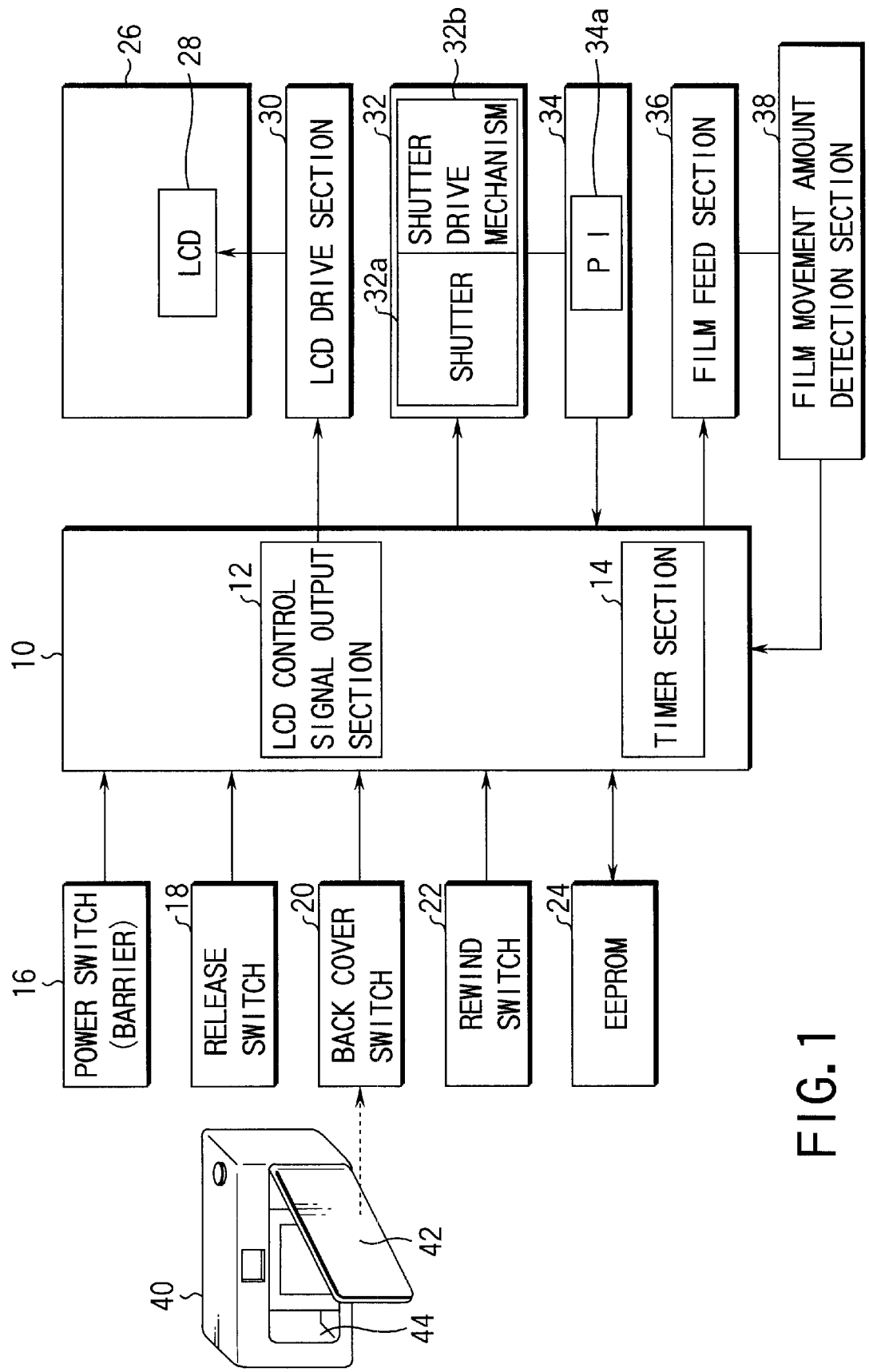
FIG. 1 is a block diagram illustrating a technical concept of a camera according to an embodiment of the present invention.

FIG. 1 is a block diagram illustrating a technical concept of a camera according to an embodiment of the present invention.

A CPU 10 controls various operations in the camera and has functions of liquid crystal control means and determination means. The CPU 10 incorporates an LCD control signal output section 12 for outputting a control signal to an LCD drive section 30 (to be described later) and a timer section 14.

The CPU 10 is connected to a power switch (barrier switch) 16, a release switch 18, a back cover switch 20 and a rewind switch 22. In addition, the CPU 10 is connected to an EEPROM 24, an LCD drive section 30 for driving a liquid crystal display (hereinafter referred to as "intra-finder LCD") 28 disposed within a finder 26, a film exposure section 32, a fault detection section 34 for detecting a fault of the film exposure section 32, a film feed section 36, and a film movement amount detection section 38.

The exposure section 32 counts an exposure time, using the timer section 14, and performs an exposure operation. T he exposure section 32 incorporates a shutter 32a for controlling an exposure amount for a film (not shown), and a shutter drive mechanism 32b for driving the shutter 32a.

The fault detection section 34 monitors the exposure operation and detects a fault of the exposure section 32. The fault detection section 34 has a photo-interrupter (PI) 34a for outputting a signal when the shutter 32a is set in an open state.

The film feed section 36 is a film feed means for performing a film auto-loading operation, a frame-of-film winding operation (for winding a film on a frame-by-frame basis) and a film rewinding operation.

The film movement amount detection section 38 detects a movement amount of the film fed by the film feed section 36.

The back cover switch 20 is a switch for detecting the open/closed state of a back cover 42 disposed on the back side of a camera body 40. When a film (not shown) is loaded in a film loading chamber 44 in the camera body 40 and the back cover 42 is closed, the film feed section 36 starts the film auto-loading/winding operation.

Figure 2:
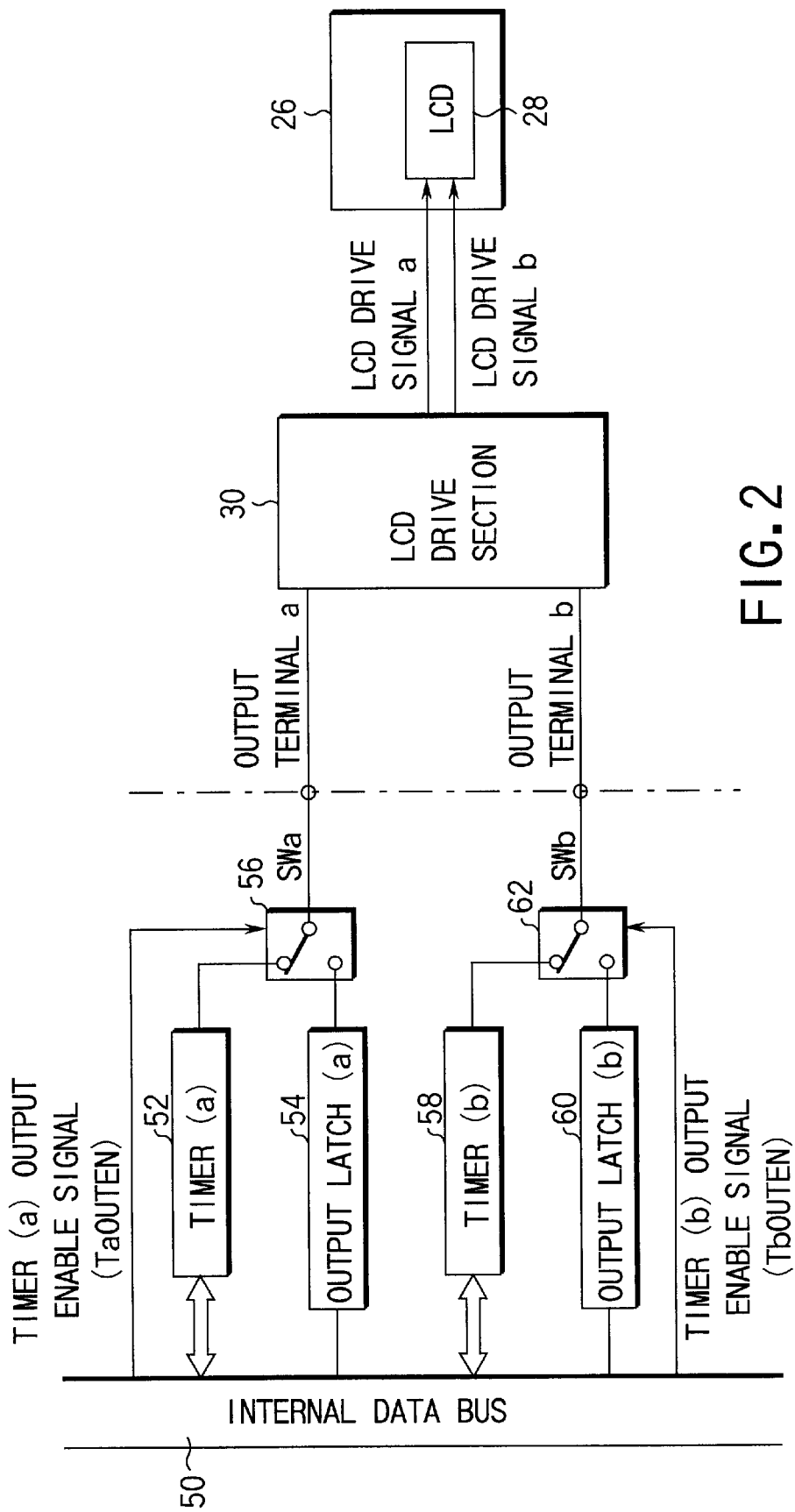
FIG. 2 shows an example of an LCD control signal output section 12 shown in FIG. 1.

Referring to FIG. 2, the LCD control signal output section 12 will now be described in detail.

The LCD control signal output section 12 includes a timer (a) 52, an output latch (a) 54, a switch (Swa) 56, a timer (b) 58, an output latch (b) 60 and a switch (SWb) 62, which are all connected to an internal data bus 50.

Each of the timer (a) 52 and timer (b) 58 generates a pulse with a duty ratio of 50%. An output pulse from the timer (b) 58 and an output pulse from the timer (a) 52 are controlled by software via the internal data bus 50 such that the phase of the former is shifted from the phase of the latter by 90°.

By software, "1" data or "0" data is set in the output latch (a) 54 and output latch (b) 60 via the internal data bus 50.

Where "1" is set in the latch, it outputs an H-level (high-level) signal. Where "0" is set in the latch, it outputs an L-level (low-level) signal. In this embodiment, "1" data is always set in the output latch (a) 54 and output latch (b) 60.

The switch (a) 56 is controlled by a timer (a) output enable signal (TaOUTEN) and selects an output from the timer (a) 52 or an output from the latch (a) 54. The selected output is delivered to an output terminal (a). In this case, when TaOUTEN=1, the output from the timer (a) 52 is selected, and when TaOUTEN=0, the output from the latch (a) 54 is selected.

Similarly, the switch (b) 62 is controlled by a timer (b) output enable signal (TbOUTEN) and selects an output from the timer (b) 58 or an output from the latch (b) 60. The selected output is delivered to an output terminal (b).

The LCD drive section 30 converts the H-level signals delivered from the output terminals (a) and (b) to voltage signals for driving the LCD 28. The converted signals are output to the LCD 28 as an LCD drive signal (a) and an LCD drive signal (b).

When the LCD drive signal (a) and LCD drive signal (b) have an equal potential, the LCD 28 takes a light-shutoff state. When there is a potential difference between the LCD drive signal (a) and LCD drive signal (b), the LCD 28 takes a light-transmissive state.

Figure 3:
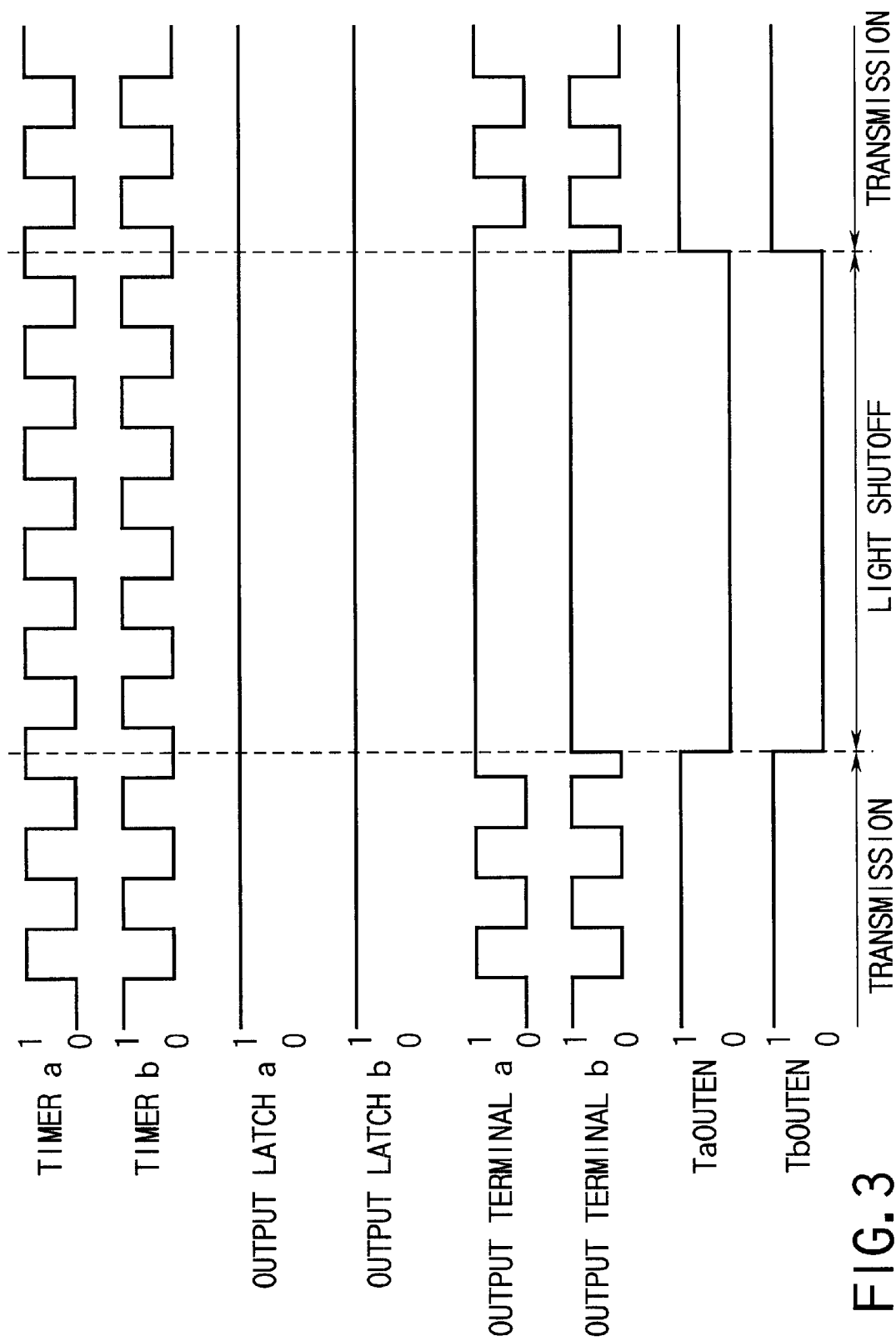
FIG. 3 is a timing chart illustrating operations associated with LCD control signals in the structure shown in FIG. 2.

FIG. 3 is a timing chart illustrating operations associated with LCD control signals in the structure shown in FIG. 2.

When both TaOUTEN and TbOUTEN are "1", the outputs from the timer (a) 52 and timer (b) 58 are delivered to the output terminals (a) and (b), and the LCD 28 takes the light-transmissive state. On the other hand, when both TaOUTEN and TbOUTEN are "0", the outputs from the output latch (a) 54 and output latch (b) 60 are delivered to the output terminals (a) and (b), and the LCD 28 takes the light-shutoff state.

Figure 4:
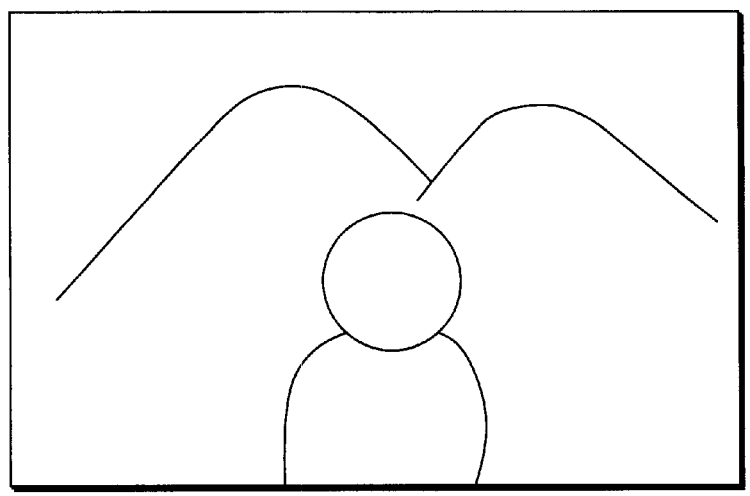
FIG. 4 shows an example of a finder image obtained when an LCD 28 is in a light-transmissive state.

FIG. 4 shows a finder image obtained when the LCD 28 is in the light-transmissive state.

Figure 5:
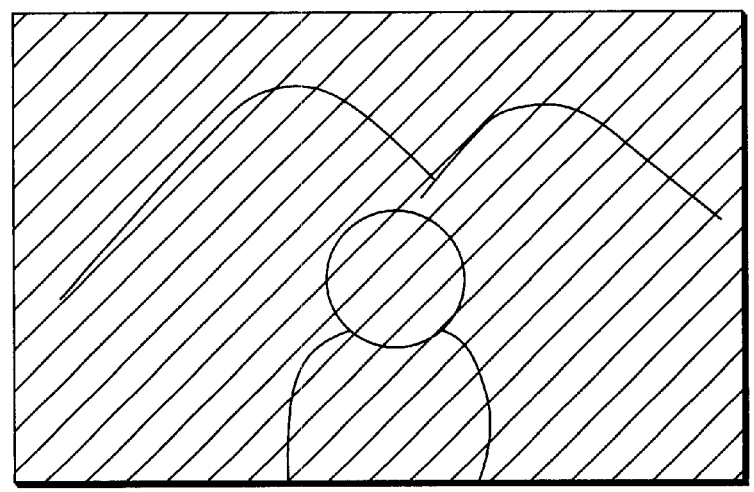
FIG. 5 shows an example of a finder image obtained when the LCD 28 is in a light-shutoff state.

FIG. 5 shows a finder image obtained when the LCD 28 is in the light-shutoff state. In FIG. 5, latching indicates the light-shutoff state.

Referring now to the flow charts of FIGS. 6A to 6C, the main operation of the camera according to this embodiment will be described in detail.

An interrupt is generated when any change occurs in the power switch 16 or back cover switch 20, and a power reset (PWRST) process is carried out. In step S1, the stack pointer is cleared and the stack level is initialized. In step S2, adjustment data necessary for controlling the camera, data representing the state of the camera, etc. is read out of the EEPROM 24 and developed on a RAM (not shown).

In step S3, the state of the power switch 16 is read. If the power switch 16 is in the ON-state, control advances to step S4 to determine whether a flag F_RWEND is "1". The flag F_RWEND is a flag which takes "1" when film rewinding is finished and "0" when the back cover 42 is opened. If the flag F_RWEND is "0" in step S4, control advances to step S5.

In step S5, a flag F_ALDNG is checked. The flag F_ALDNG takes "1" when auto-loading failed and "0" when the back cover 42 is open. When the flag F_ALDNG=0, control advances to step S6 to execute a subroutine "FLCDON". The subroutine "FLCDON" is a subroutine for setting the intra-finder LCD 28 disposed in the finder 26 in the light-transmissive state.

If the power switch is in the OFF-state in step S3, or if the flag F_RWEND is "1" in step S4, or if the flag F_ALDNG is "1", control advances to step S7 to execute a subroutine "FLCDOF". The subroutine "FLCDOF" is a subroutine for setting the intra-finder LCD 28 in the light-shutoff state.

In a subsequent step S8, a subroutine "INTRA-FINDER LCD DRIVING TIMER START" is executed. Where the subroutine "FLCDON" is already executed, the LCD 28 is actually set in the light-transmissive state.

Through steps S3 to S8, the LCD 28 is controlled to take the light-transmissive state where the power switch 16 is in the ON-state, the film rewinding is not finished and the auto-loading does not fail. In other cases, the LCD 28 is controlled to have the light-shutoff state.

In step S9, it is determined whether programs are started by a change in the back cover switch 20. If programs are started by a change in the back cover switch 20, control advances to step S10. If the back cover switch 20 is in the open state after such a change, control advances to step S1. On the other hand, if the back cover switch 20 is in the closed state, control goes to step S14. If there is no change in the back cover 42 in step S9, control advances to step S18.

In step S11, the flag F_BKCLOS is set at "0" to store data on the open state of the back cover 42. In step S12, the flag F_ALDNG is set at "0" to cancel data on the auto-load failure state. Further, in step S13, the flag F_RWEND is set at "0" to cancel data on the rewinding completion state.

On the other hand, in step S14, the flag F_BKCLOS is set at "1" to store data on the closed state of the back cover 42. In step S16, it is determined whether the auto-loading failed. If the auto-loading failed, control goes to step S17 and the flag F_ALDNG is set at "1" to store data on the auto-load failure state. If the auto-loading failure is not determined in step S16, control goes to step S18.

In step S18, a flag F_WNDREQ is checked. The flag F_WNDREQ takes value "1" when one frame of the film needs to be wound up and it takes value "0" when the winding of one frame is finished. In step S18, if the flag F_WNDREQ is "1", control goes to step S19 to perform a frame windup operation, and value "0" is set in the flag F_WNDREQ after completion of the frame windup operation. On the other hand, if the flag F WNDREQ is "0" in step S18, control goes to step 22.

In step S20, it is determined whether a film end has been detected after the completion of the frame windup operation. If the film end is detected, control goes to step S21 to set a flag F_RWREQ at "1". It is thus determined that there is a request for rewinding the film. If the film end is not detected in step S20, control goes to step S22.

In step S22, the flag F_RWREQ is checked. The flag F_RWREQ indicates the presence of a rewind request. The flag F_RWREQ takes value "1" when the film end is detected after the frame winding operation or when the back cover 42 is closed and a forcible rewind switch 22 is depressed. The flag F_RWREQ takes value "0" when the rewind operation is finished.

In step S22, if the flag F_RWREQ is "1", control advances to step S23 to execute the rewind operation. If the rewind operation is completed, the flag F_RWREQ is set at "0". Then, in step S24, a flag F_RWEND is set at "1" to store data on the rewind completion state.

The subsequent steps S25 to S29 are the same as the above-described steps S3 to S7, and so a description thereof is omitted. In steps S25 to S29, the operation state of the LCD 28 is updated on the basis of the state of the camera updated through steps S9 to S24.

Figure 7:
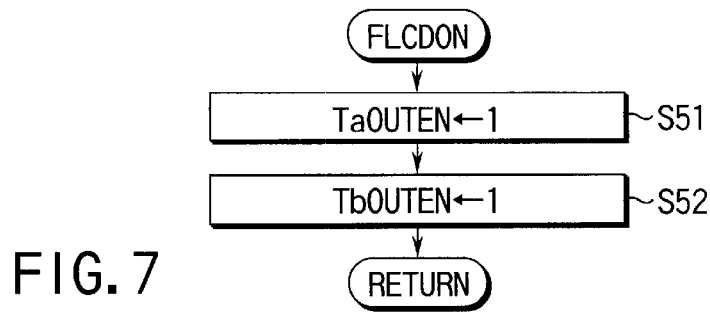
FIG. 7 is a flow chart illustrating a subroutine "FLCDON" for starting an intra-finder LCD driving timer.

The operations in the subroutine "FLCDON" and subroutine "FLCDOF" will now be described with reference to flow charts of FIGS. 7 and 8.

To begin with, the subroutine "FLCDON" illustrated FIG. 7 will now be described.

In step S51, the timer (a) output enable signal TaOUTEN is set at "1" and the output from the timer (a) 52 in FIG. 2 is delivered to the output terminal (a). In step S52, the timer (b) output enable signal TbOUTEN is set at "1" and the output from the timer (b) 58 in FIG. 2 is delivered to the output terminal (b). Control is then returned to the main routine, and this subroutine is completed.

Figure 8:
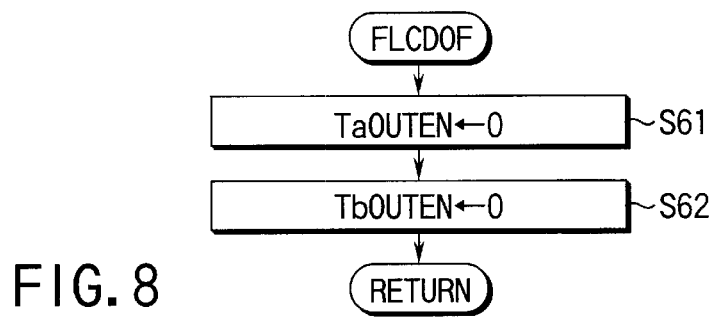
FIG. 8 is a flow chart illustrating a subroutine "FLCDOF" for stopping the intra-finder CLKD driving timer.

FIG. 8 is a flow chart illustrating the operation of the subroutine "FLCDOF".

In step S61, the timer (a) output enable signal TaOUTEN is set at "0" and the output from the output latch (a) 54 in FIG. 2 is delivered to the output terminal (a). In step S62, the timer (b) output enable signal TbOUTEN is set at "0" and the output from the output latch (b) 60 in FIG. 2 is delivered to the output terminal (b). Control is then returned to the main routine, and this subroutine is completed.

Figure 9:
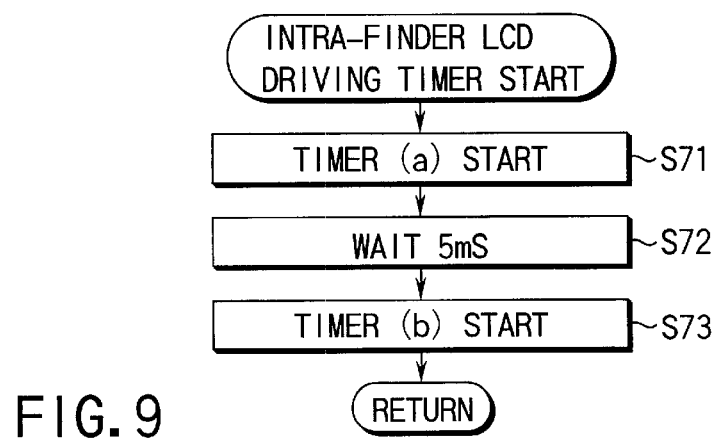
FIG. 9 is a flow chart illustrating a subroutine "INTRA-FINDER LCD DRIVING TIMER START" for setting the intra-finder LCD in a light-transmissive state.

The subroutine "INTRA-FINDER LCD DRIVING TIMER START" will now be described with reference to FIG. 9.

In step S71, the timer (a) is started. The timer (a) generates 100 Hz pulses with a duty ratio of 50%. In step S72, a wait time of 5 ms, which corresponds to a ½ cycle of the output pulse of the timer (a), is provided. In step S73, the timer (b) is started. The timer (b) generates 100 Hz pulses with a duty ratio of 50%. Control is then returned to the main routine, and this subroutine is completed.

Figure 10:
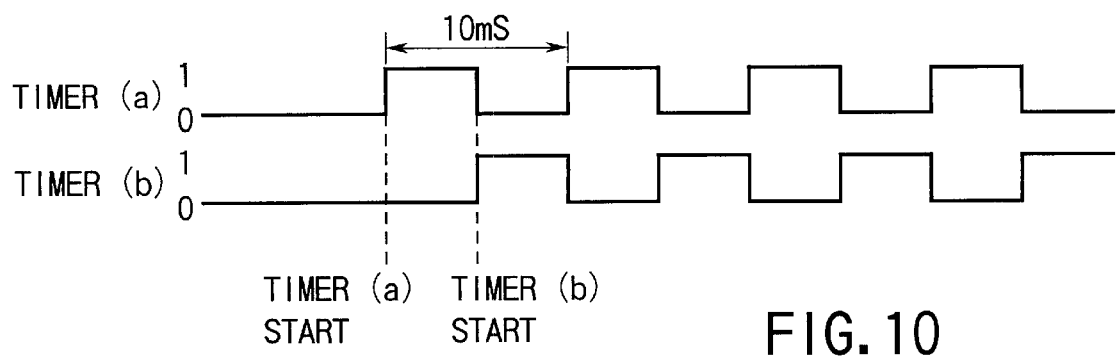
FIG. 10 is a timing chart illustrating a process of starting the intra-finder LCD driving timer.

Accordingly, if the subroutine "INTRA-FINDER LCD DRIVING TIMER START" is executed, 100 Hz pulses with a 90° phase shift are generated, as illustrated in a timing chart of FIG. 10.

Figure 11:
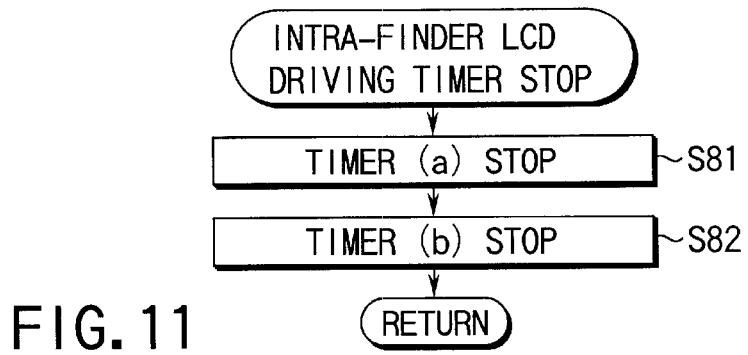
FIG. 11 is a flow chart illustrating a subroutine "INTRA-FINDER LCD DRIVING TIMER STOP" for setting the intra-finder LCD driving timer in a light-shutoff state.

FIG. 11 illustrates a subroutine "INTRA-FINDER LCD DRIVING TIMER STOP".

To start with, the timer (a) is stopped in step S81 and the timer (b) is then stopped in step S82. Control is then returned to the main routine, and this subroutine is finished.

Figure 6A:
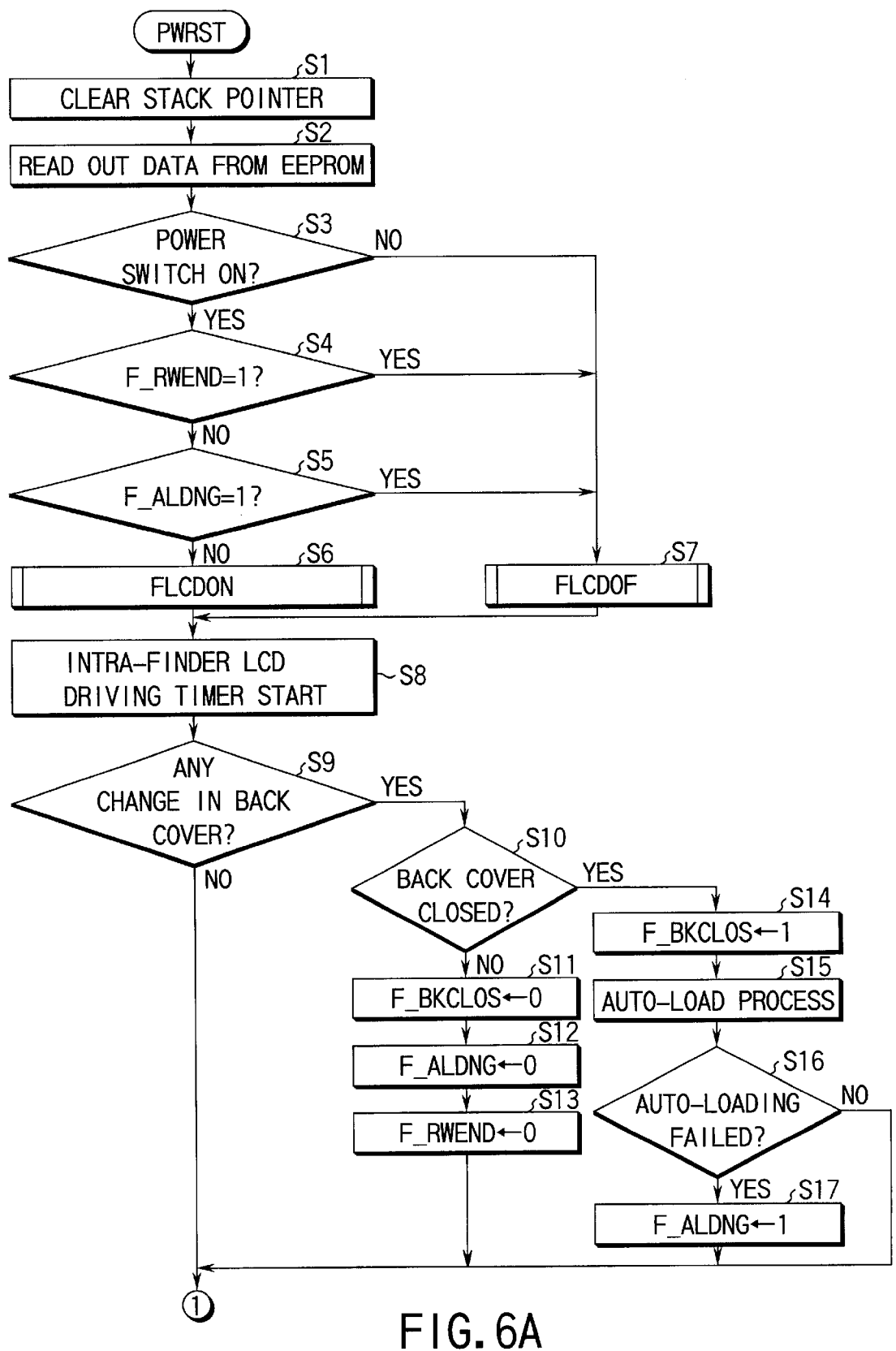
FIGS. 6A to 6C are flow charts illustrating a main operation of the camera.
Figure 6B:
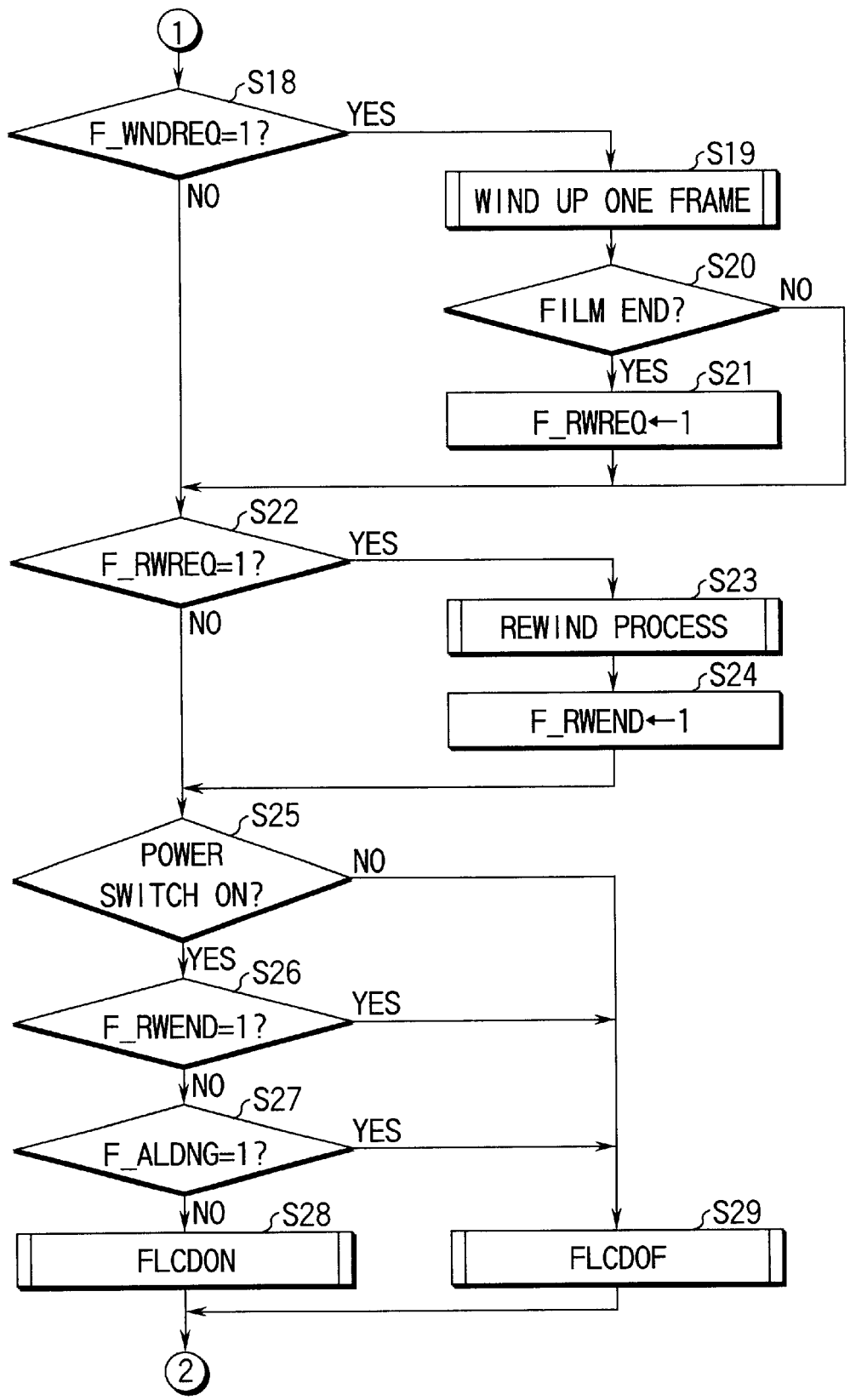
Figure 6C:
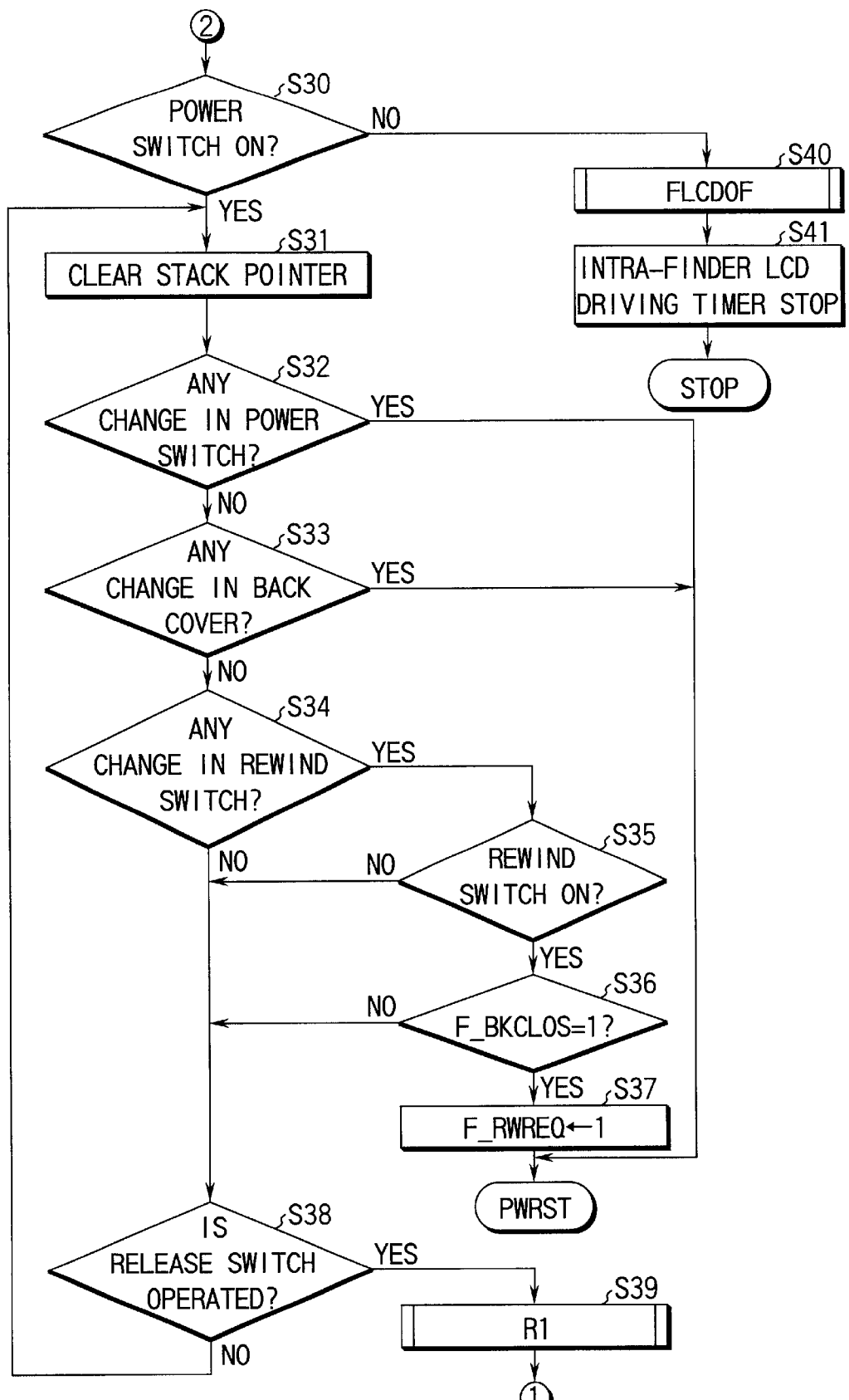

Referring back to the flow charts of FIGS. 6A to 6C, it is determined in step S30 whether the power switch 16 is in the ON-state. If the power switch 16 is in the ON-state, control advances to step S31. If the power switch 16 is in the OFF-state, control advances to step S40.

In step S31, the stack pointer is cleared. In step S32, it is determined whether any change has occurred in the power switch. If any change has occurred in the power switch, control jumps to the routine "PWRST" illustrated in FIG. 6A.

In step S32, if there is no change in the power switch, control advances to step S33 to determine whether any change has occurred in the back cover 42. If there is a change, control jumps to the routine "PWRST" illustrated in FIG. 6A. If there is no change in the back cover 42 in step S33, control advances to step S34 to determine whether there is any change in the rewind switch 22.

If there is a change in the rewind switch 22, control advances to step S35 to determine whether the rewind switch 22 after such a change is in the ON-state. If the rewind switch 22 is in the OFF-state, control goes to step S38. If the rewind switch 22 is in the ON-state, control goes to step S36.

In step S36, the flag F_BKCLOS indicating the current state of the back cover switch 20 is checked. If the flag F_BKCLOS is "1" ("closed state"), control goes to step S37 and "1" is set in the flag F_RWREQ indicating the rewind request. Then, control jumps to the routine "PWRST" illustrated in FIG. 6A. Thereby, the rewind switch 22 is changed to the ON-state and, when the back cover 42 is in the closed state, the rewind request is issued.

In step S36, if the flag F_BKCLOS is "0", control advances to step S38. In step S38, it is determined whether the release switch 18 is operated. If the release switch 18 is operated, control goes to step S39 to call a subroutine "R1" for performing a distance measuring operation, a light measuring operation and an exposure operation. Then, control returns to step S18 in FIG. 6B.

In step S38, if the release switch 5 is not operated, control returns to step S31, thereby constituting a main loop.

On the other hand, if the power switch 16 is in the OFF-state in step S30, control advances to step S40. Since the camera is not powered, the above-described subroutine "FLCDOF" is called in step S40 and the LCD 28 is set in the light-shutoff state. Following step S40, the above-described operation of "INTRA-FINDER LCD DRIVING TIMER STOP" is carried out in step S41 and the consumption current is reduced to a minimum. Then, the CPU 10 stands in the stopped state.

Figure 12:
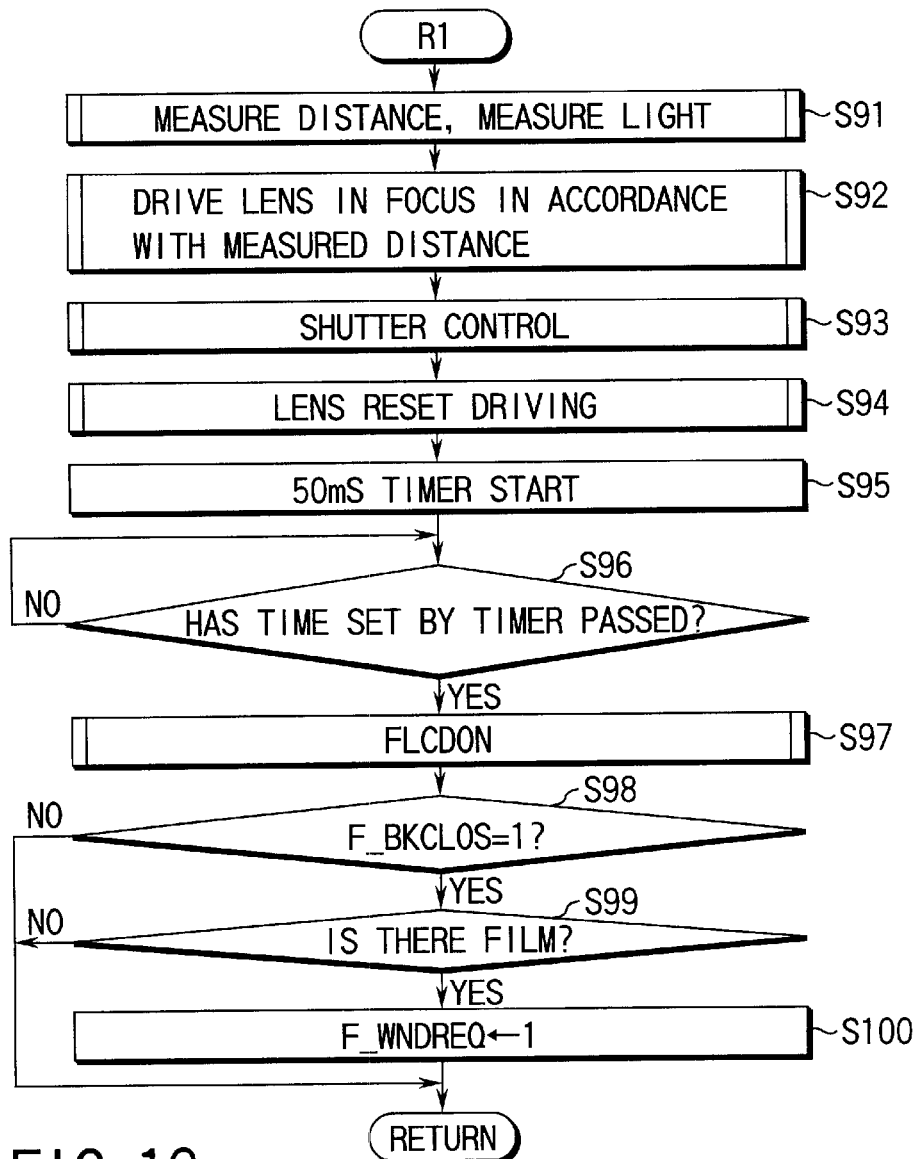
FIG. 12 is a flow chart illustrating a subroutine "R1" for a release process.

With reference to a flow chart of FIG. 12, the subroutine "R1" will now be described.

To start with, in step S91, distance measurement and light measurement are carried out to find an amount of movement of the photographing lens to a focal point and a shutter opening time for acquiring a proper exposure amount. In subsequent step S92, the photographing lens is driven in accordance with the amount of movement of the lens, which has been found in step S91.

In step S93, a shutter control, or an exposure control for achieving proper exposure, is executed. In this case, while the shutter is being controlled, the LCD 28 is set in the light-shutoff state in order to indicate that the exposure control is being carried out. In step S94, lens reset driving is effected to restore the photographing lens, which is disposed in focus, to a reset position.

In step S95, a 50 ms timer is started. In step S96, it is determined whether a time set by the timer has passed. If the time set by the timer has passed, control goes to step S97 to execute the subroutine "FLCDON". The LCD 28 is restored to the light-transmissive state.

The light-shutoff state of the LCD 28 indicating the exposure in progress is thus finished. Even if the shutter speed is high, the light-shutoff state can be maintained for a duration corresponding to a sum of the lens reset time and 50 ms. Therefore, even with a liquid crystal with a low reaction speed, the exposure can exactly be recognized.

In step S98, the flag F_BKCLOS indicating the state of the back cover switch 20 is checked. If the flag F_BKCLOS is "0" ("open state"), the present subroutine "R1" is finished. If the flag F_BKCLOS is "1" ("closed state") in step S98, control goes to step S99.

In step S99, it is determined whether a film is loaded. If the film is not loaded, the present subroutine is finished. If the film is loaded, the frame windup operation needs to be performed and control advances to step S100. In step S100, "1" is set in the flag F_WNDREQ indicating the presence of the frame windup request, and then control is returned.

Figure 13:
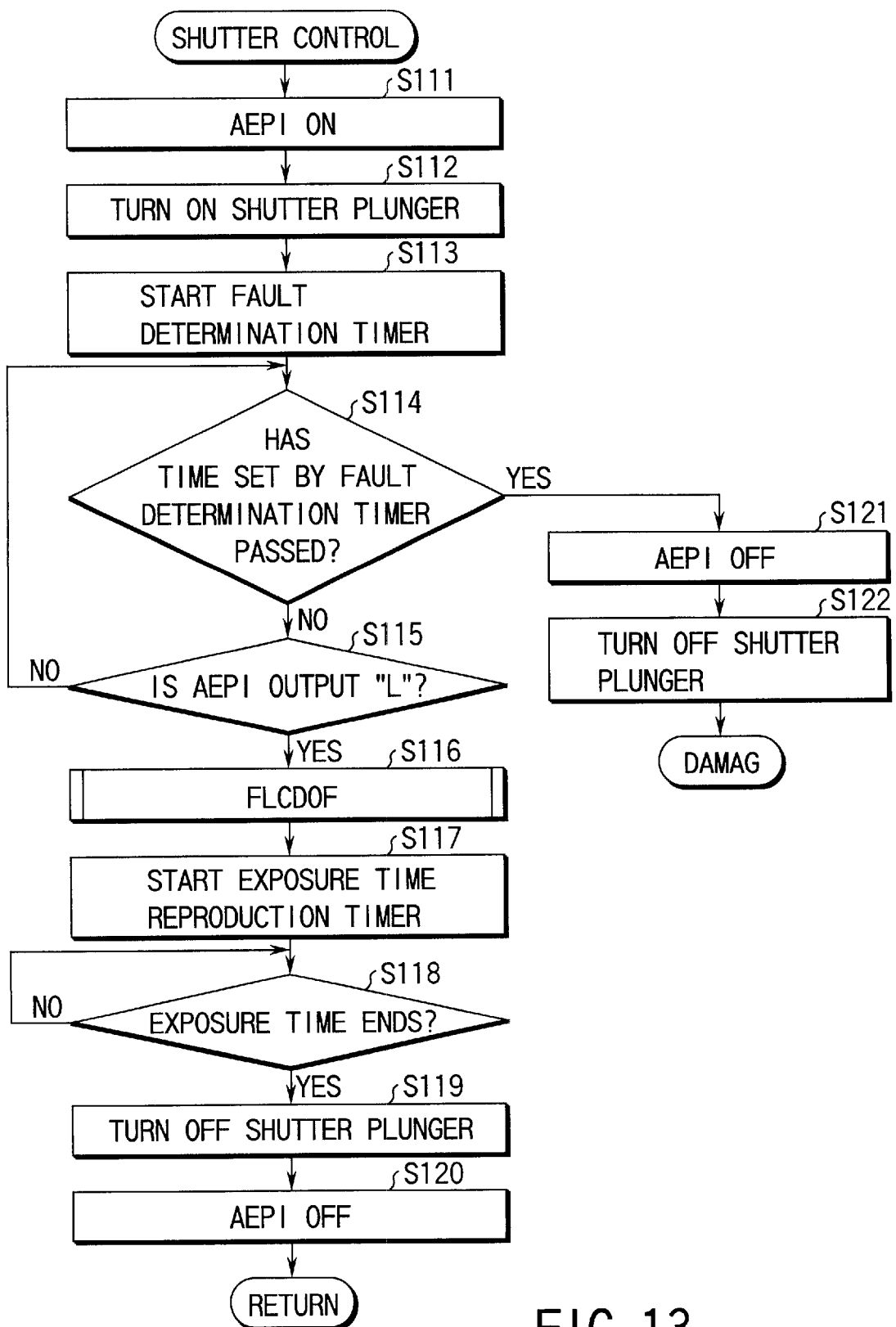
FIG. 13 is a flow chart illustrating an operation in a subroutine "SHUTTER CONTROL" for a shutter control.

With reference to a flow chart of FIG. 13, the operation of the subroutine "SHUTTER CONTROL" will now be described.

To start with, in step S111, an AEPI (not shown), which is the photo-interrupter 34a whose output is inverted when the shutter begins to open, turned on. In step S112, a shutter plunger (not shown) for driving the shutter is turned on. In step S113, a fault determination timer (not shown) for providing a reference time for determining a shutter fault is started.

In step S114, it is determined whether a time set by the fault determination timer has passed. If the time set by the fault determination timer has not passed, it is determined in a subsequent step S115 whether an output of the AEPI is at "L" level.

When the shutter is not opened, the output of the AEPI is at "H" level. When the shutter begins to open, the output of the AEPI changes to "L" level. If the output of the AEPI is at "H" level in step S115, control returns to step S114. On the other hand, if the output of the AEPI is at "L" level, control advances to step S116.

If the output of the AEPI changes from "H" to "L" during a time period between the turning-on of the shutter plunger in step S113 and the end of the time set by the fault determination timer, it is determined that the operation of the shutter is normal. If the time set by the fault determination timer has passed while the output of the AEPI remains at "H" level, the occurrence of a fault is determined since the shutter is not opened.

If it is determined that there is no fault in the shutter, control advances to step S116 and the subroutine "FLCDOF" is executed to indicate that the exposure is in progress. Thus, the LCD 28 is set in the light-shutoff state.

In step S117, an exposure time reproduction timer is started to control an exposure time. In step S118, whether the exposure time has ended is determined on the basis of the end of the time set by the exposure time reproduction timer. If the exposure time has ended, control advances to step S119 and the shutter plunger is turned off. The shutter is thus closed.

In step S120, the AEPI is turned off. Then control is returned and this subroutine is finished.

In the shutter control, the LCD 28 is set in the light-shutoff state only when a fault of the shutter is not determined.

On the other hand, if the time set by the fault determination timer has passed in step S114, control advances to step S121 and the AEPI is turned off. Subsequently, in step S122, the shutter plunger is turned off. Then, control jumps to a subroutine "DAMAG" which is a process to be carried out when a fault has occurred.

Figure 14:
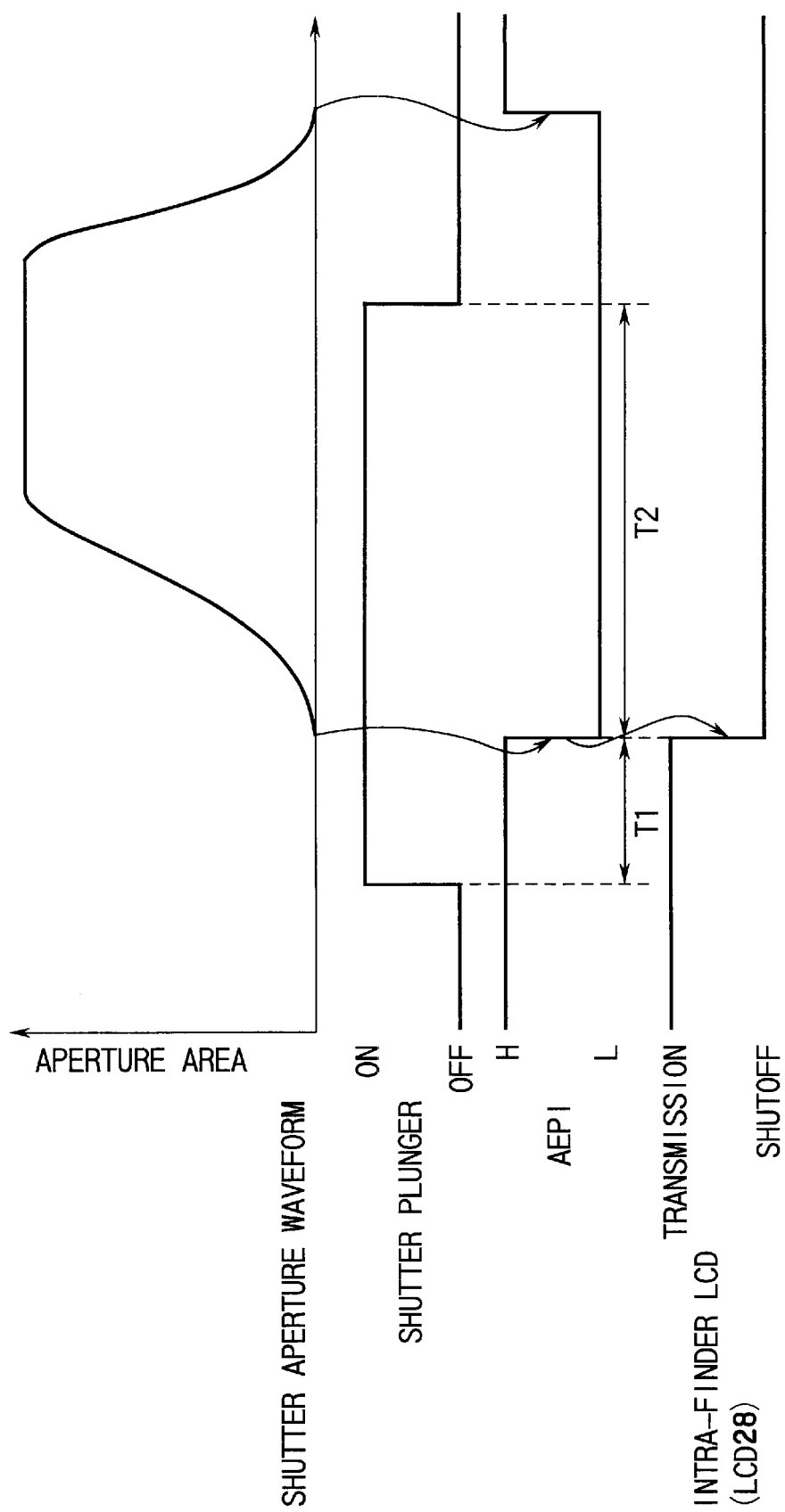
FIG. 14 is a timing chart illustrating the operation for shutter control.

FIG. 14 is a timing chart illustrating the shutter control operation.

If the shutter plunger (not shown) is turned on and the shutter begins to open, the AEPI changes from "H" state to "L" state. In this case, if a time T1 between the turning-on of the shutter plunger and the change of the AEPI from "H" state to "L" state is longer than the time set by the fault determination timer, the occurrence of a fault is determined. If the time T1 is shorter than the time set by the fault determination timer, it is determined that no fault has occurred.

Consequently, the LCD 28 changes from the light-transmissive state to the light-shutoff state, and the exposure time reproduction timer for counting a time T2 indicative of an exposure time is started. If time T2 has passed, the shutter plunger is turned off and the shutter begins to close. If the shutter is completely closed, the AEPI restores to the "H" state and the shutter control is finished.

Figure 15:
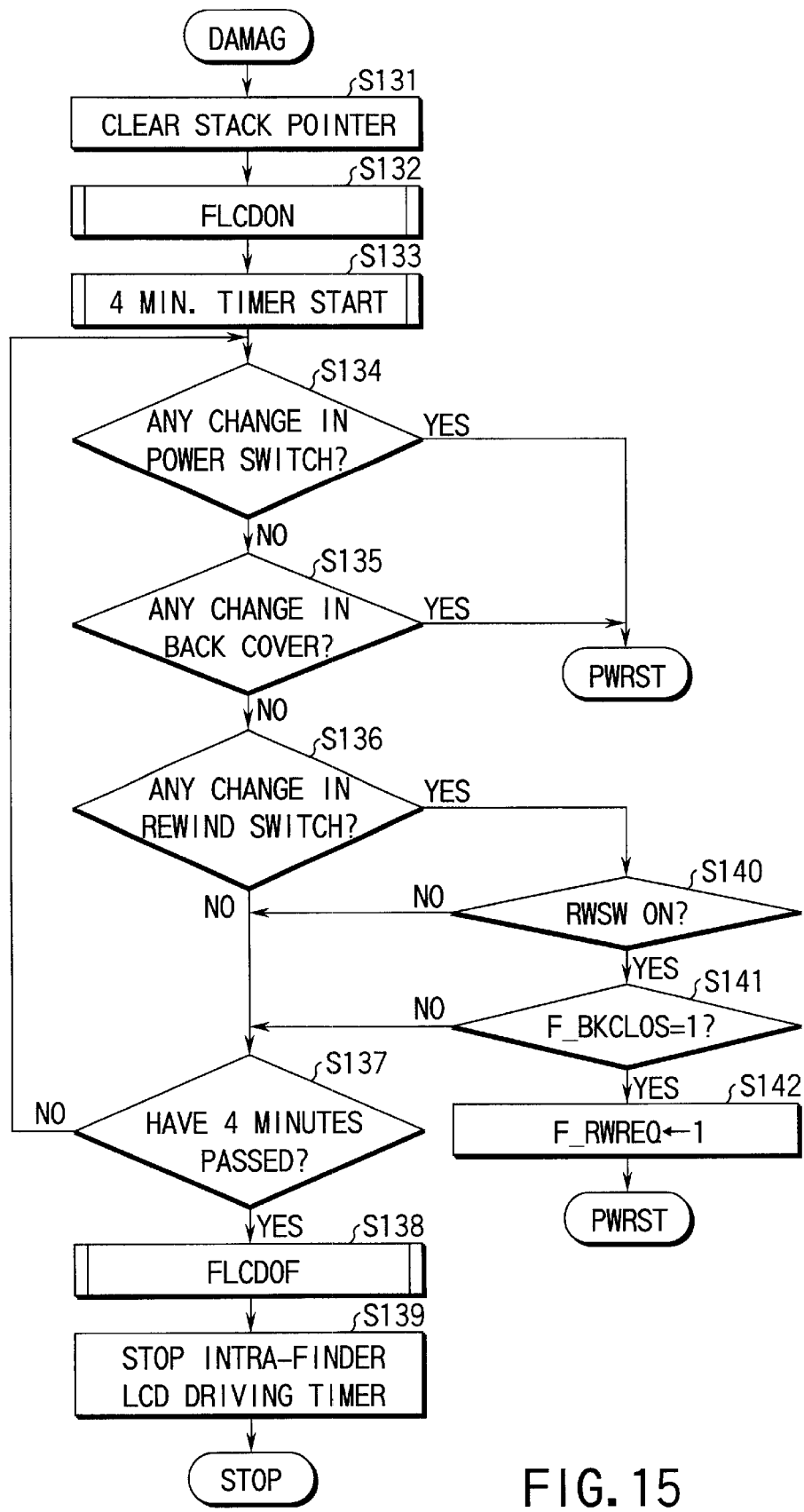
FIG. 15 is a flow chart illustrating an operation in a subroutine "DAMAG" for dealing with a fault in the camera

With reference to a flow chart of FIG. 15, the subroutine "DAMAG", which is a process to be carried out when a fault has occurred, will now be described.

To begin with, in step S131, the stack pointer is cleared. In step S132, the subroutine "FLCDON" is executed to set the LCD 28 in the light-transmissive state. Subsequently, in step S133, a 4-minutes timer is started.

In step S134, it is determined whether any change has occurred in the power switch 16. If a change has occurred in the power switch 16, control jumps to the routine "PWRST" illustrated in FIG. 6A and returns from the fault process.

On the other hand, if there is no change in the power switch 16 in step S134, control advances to step S135 to determine whether any change has occurred in the back cover. If any change has occurred in the back cover, control jumps to the routine "PWRST" illustrated in FIG. 6A and returns from the fault process.

If there is no change in the back cover in step S135, control advances to step S136. In step S136, it is determined whether any change has occurred in the rewind switch 22. If there is any change in the rewind switch 22, control goes to step S140.

In step S140, it is determined whether the rewind switch 22 is in the ON-state. If the rewind switch 22 is in the OFF-state, control goes to step S137. If the rewind switch 22 is in the ON-state, control goes to step S141.

In step S141, the flag F_BKCLOS indicating the state of the back cover is determined. If the flag F_BKCLOS is "0", control advances to step S137. On the other hand, if the flag F_BKCLOS is "1", control advances to step S142 to set "1" in the flag F_REREQ indicating the presence of the rewind request. Then, control jumps to the routine "PWRST" illustrated in FIG. 6A and re turns from the fault process.

In step S137, it is determined whether four minutes have passed since the 4-minute timer was started in step S133. If four minutes have not yet passed, control returns to step S134, thus constituting a fault process loop on the other hand, if four minutes have passed in step S137, control advances to step S138 to execute the subroutine "FLCDOF". Thus, the LCD 28 is set in the light-shutoff state.

In subsequent step S139, the intra-finder LCD driving timer is stopped, and the consumption current is reduced to a minimum. Then, the CPU 10 is set in the stopped state.

As has been described above, according to the present invention, the LCD in the finder is set in the light-shutoff state in the case of such a photographing prohibition state as a rewinding completion state or an auto-loading failure state. Therefore, the photographing prohibition state can exactly be recognized.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A camera comprising:

a finder;

a liquid crystal display having a variable transmissivity disposed within the finder;

film feed means for feeding a film;

a film loading chamber which accommodates the film;

a film loading chamber cover for the film loading chamber;

detection means for detecting an open/closed state of the film loading chamber cover;

control means for lowering the transmissivity of the liquid crystal display when a film rewinding operation by the film feed means has been completed normally, and for then raising the transmissivity of the liquid crystal display when the detection means has detected that the state of the film loading chamber cover has changed from the open state to the closed state.

* * * * *